June 24, 1941.  R. B. KALE  2,246,852

SNAP FASTENER

Filed Oct. 30, 1939

INVENTOR.
R. B. KALE
BY
M. Talbert Dick
ATTORNEY.

Patented June 24, 1941

2,246,852

UNITED STATES PATENT OFFICE 2,246,852

SNAP FASTENER

Raymond B. Kale, Des Moines, Iowa

Application October 30, 1939, Serial No. 302,014

1 Claim. (Cl. 24—224)

The principal object of my invention is to provide a snap fastener that will not become accidentally unfastened when once closed to a fastened condition.

More specifically, the object of this invention is to provide a strong snap fastener that when once placed in a fastened condition, will not become unfastened regardless of the amount of stress, pull or strain placed upon it.

A still further object of this invention is to provide a snap fastener that may be successfully used on clothes or like and will not become damaged during the time of washing the clothes to which the snap fastener is applied.

A still further object of this invention is to provide a snap fastener that shows automatic locking features and one that will not become accidentally distorted in use.

A still further object of this invention is to provide a self-locking snap fastener that may be used on various types of garments.

A still further object of this invention is to provide a snap fastener that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claim and illustrated in the accompanying drawing, in which:

The use of various types of snap fasteners is very old. In most instances, however, such snap fasteners are very fragile, become easily unhooked or unlocked and the distortion of the cloth to which they are secured when the cloth is moved in certain directions. Obviously such snap fasteners are limited in their use and are usually found on women's dresses and the like. Furthermore such snap fasteners of the ball and socket type quickly wear out after which they either cannot be locked or will not stay in locked condition after they have been placed in such fastened arrangement. I have overcome such objections by providing a very strong, neat and flat snap fastener that stays in locked condition after it is once placed in the same and will stand exceptionally hard and rough usage.

Figure 1:
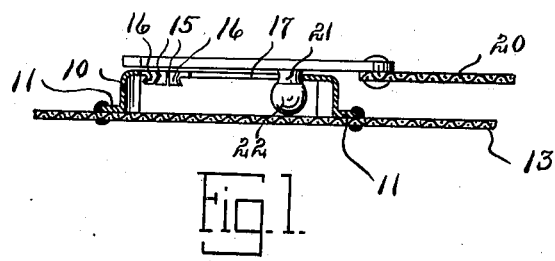
Fig. 1 is a side sectional view of my snap fastener in use.
Figure 2:
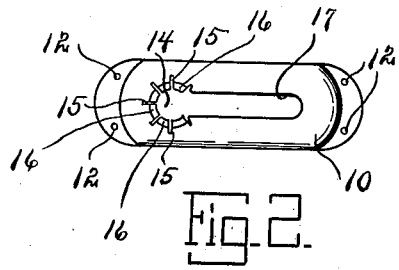
Fig. 2 is a top plan view of the slotted base portion of the fastener.
Figure 3:
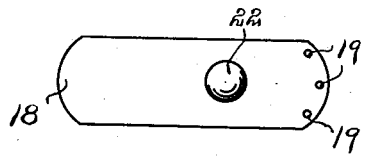
Fig. 3 is a bottom plan view of the detachable portion of the device.

Referring to the drawing, I have used the numeral 10 to designate the elongated cup shaped base retaining member. This base member 10 has flanges 11 extending outwardly on each of its end rim portions, as shown in Fig. 1 and Fig. 2. These flanges 11 are provided with small thread holes 12. In actual practice this base member 10 is placed in an inverted position on the cloth or like 13 and is secured to such cloth or like by sewing through the holes 13 or otherwise suitably securing the flange portions 11 to the cloth. The numeral 14 designates a circular opening in the bottom of the member 10. Radially extending slots 15 are cut in the bottom of the member 10 and communicate with the circular hole opening 14 as shown in Fig. 2. The resulting prong portions 16 between the radially extending slots 15 are bent downwardly and inwardly and then downwardly and outwardly, as shown in Fig. 1. As the member 10 is preferably made of suitable spring metal, the diameter of the circular opening 14 will be capable of yieldable increase. Obviously by forcing the prongs 16 outwardly the diameter of the opening 14 will be increased. The numeral 17 designates an elongated slot cut in the bottom of the member 10 and communicating with the opening 14 as shown in Fig. 2. The extreme diameter of the opening 14 is substantially greater than the width of the slot 17. The numeral 18 designates the movable portion of my snap fastener and consists of a flat piece of metal or like having holes 19 near one of its ends as shown in Fig. 3. This member 18 is designed to be secured to the other piece of cloth 20, which is thereby secured to the cloth 13 at times. Any suitable means may be used to secure one end of the member 18 to the cloth 20, such as by passing rivets or thread through the holes 19 and the cloth 20, as shown in Fig. 1. The numeral 21 designates a circular neck portion on the bottom side of the member 18. This neck portion 21 has a diameter slightly less than the width of the slot 17. The numeral 22 designates an enlarged ball head on the free end of the neck 21, as shown in Fig. 1. The diameter of this ball head 22 is substantially greater than the diameter of the neck 21 or the width of the slot 17. The diameter of the ball head 22 is less than the extreme expanded diameter of the opening 14, but is greater in diameter than the minimum contracted diameter of the hole opening 14.

To use my device, it is merely necessary to place the ball head 22 into the opening 14 and place downwardly in order to force the ball head through the yieldable opening 14 and to a portion inside the inverted cup portion 14. As soon as the ball head 22 is clear of the spring finger projections 16, the spring finger projections will contract, thereby making the opening 14 of a less diameter than the diameter of the ball head. The opening 14 is locked near one end of the member 10 and the ball head 22 is next moved to the other end of the member 10 with the neck portion 21 extending through the slot 17. Obviously in placing the member 10 on the cloth or like 13, the end of the member 10 having the opening 14 is placed furthest away from the cloth 20 to be held, as shown in Fig. 1. In most instances the cloth 13 and the cloth 20 will have a tendency to move away from each other thereby holding the head 22 under and to the right of the slot 17 as shown in Fig. 1. Obviously when the snap fastener is in such condition with the enlarged head 21 below the slot 17, the snap fastener cannot possibly become accidentally unfastened. As the head 22 and neck 21 are circular, the member 18 may rotate relative to the member 10, thereby making for a universal snap fastener and preventing any distortion of the cloth or like being held regardless of the relative angle to which one piece of cloth is being pulled, relative to the other piece of cloth to which it is secured. The dimensions of the member 18 are such that when the snap fastener is in closed condition, this member will substantially cover the top of the member 10, thereby hiding the opening 14 and slot 17. To detach the movable portion of my snap fastener from the fixed position, it is merely necessary to slide the member 18 to the left, in order to bring the enlarged head member 22 directly under the yieldable opening 14, after which the member 18 is moved directly away from the member 10, pulling the enlarged head 22 through the spring finger projections 16.

Some changes may be made in the construction and arrangement of my improved snap fastener without departing from the real spirit and purpose of my invention, and it is my intention to cover by my claim any modified forms of structure or use of mechanical equivalents which may be reasonably included within their scope.

I claim:

In a device of the class described, an elongated inverted cup member having a circular opening in its bottom and an elongated straight slot opening in its bottom communicating with the circular opening, and spring finger elements integrally formed on said inverted cup member forming the circumference of said circular opening and extending first inwardly and downwardly and then downwardly and outwardly; said circular opening designed to receive an enlarged circular headed element.

RAYMOND B. KALE.